April 30, 1929.　　　E. W. HOGAN　　　1,711,056

COMBINED CASH REGISTER AND ACCOUNTING SYSTEM

Filed Dec. 12, 1927　　　2 Sheets-Sheet 1

INVENTOR.
E. W. Hogan
BY J. Edward Maybee
ATTY.

April 30, 1929.   E. W. HOGAN   1,711,056

COMBINED CASH REGISTER AND ACCOUNTING SYSTEM

Filed Dec. 12, 1927   2 Sheets-Sheet 2

INVENTOR.
E. W. Hogan.
BY J. Edward Maubee
ATTY.

Patented Apr. 30, 1929.

1,711,056

UNITED STATES PATENT OFFICE.

ENOS WILLIAM HOGAN, OF EMO, ONTARIO, CANADA.

COMBINED CASH REGISTER AND ACCOUNTING SYSTEM.

Application filed December 12, 1927. Serial No. 239,461.

This invention relates to a combined cash register and sales recording device, and my object is to provide a device of this kind whereby each transaction is recorded three times, thus providing triple checking of all business done, and which will record the details of each sale such as amount, nature of the goods, department in which the sale was made and the clerk making the sale.

I attain my object by constructing a cash register having a cash drawer, containers for tokens representing coins or bills of various denominations from 1¢ to $100.00. A token drawer divided into various compartments which may be labelled to represent various compartments of the store, and a recording device on which may be recorded by the clerk various details of the sale.

The construction is hereinafter described and shown in the accompanying drawings in which Fig. 1 is a perspective view;

In the drawings the figures refer to corresponding parts in the different views.

Figure 1:
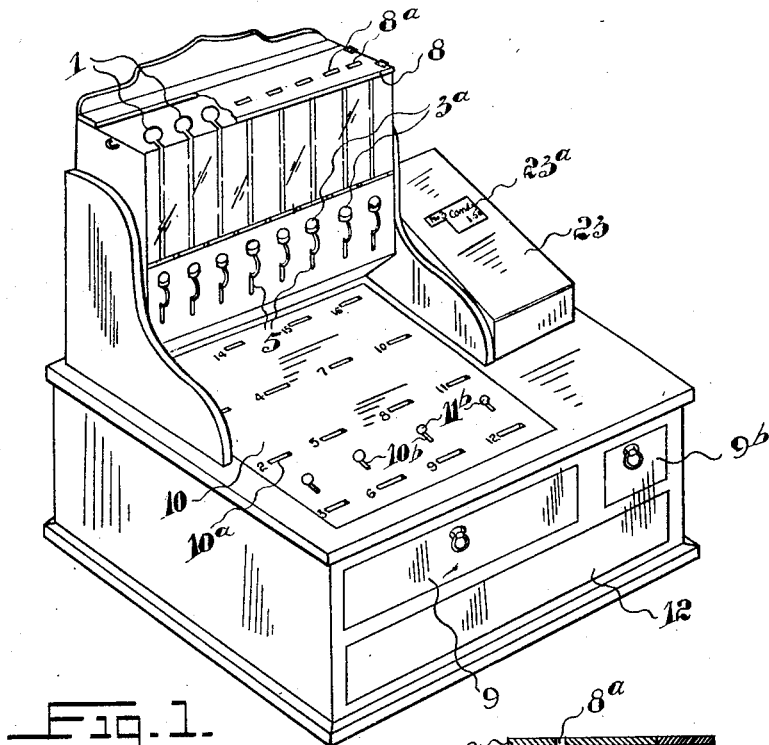
Figure 2:
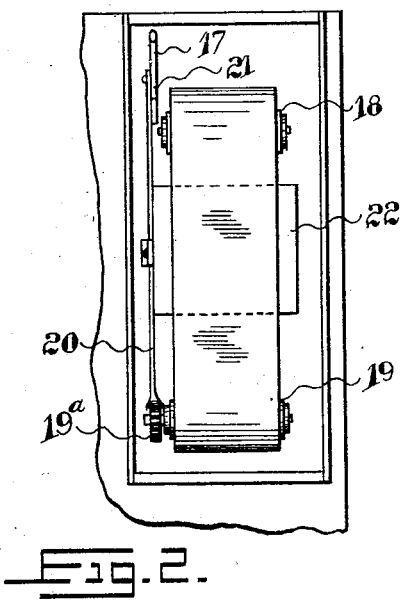
Fig. 2 is a plan view of the sales recording device with the cover removed.
Figure 5:
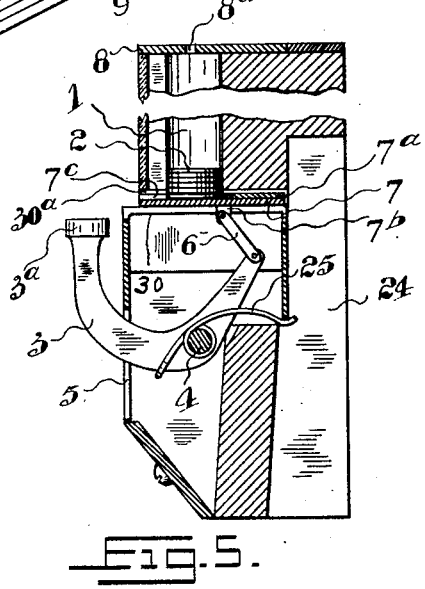
Fig. 5 is a vertical section of part of the device showing the arrangement of the token ejecting means on the last tube.
Figure 3:
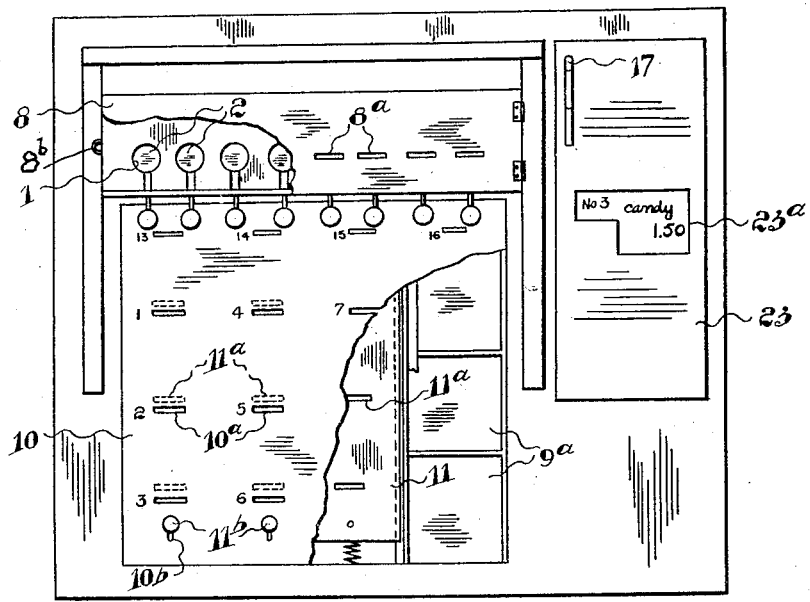
Fig. 3 is a plan view, partly broken away.
Figure 4:
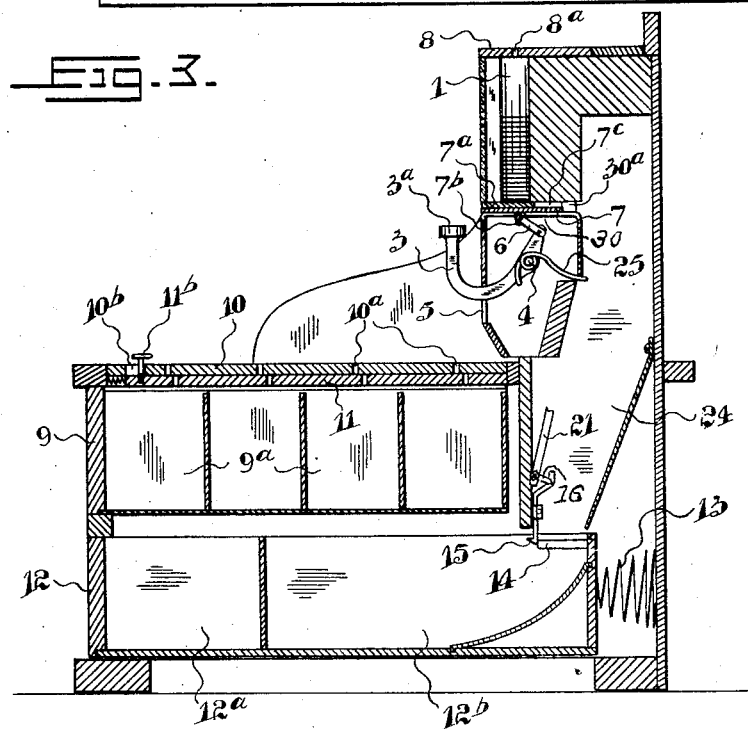
Fig. 4 is a vertical section of the device.

1 represents tubes adapted to carry tokens 2 representing various units of money, coins or bills, the first tube for example carrying 1¢ tokens, the second tube 5¢ tokens and so on, the last tube containing $10.00 tokens, or any multiple of ten, as $20.00, $30.00, $40.00, and so on. Each token is marked with the amount that it represents and tokens of each denomination are preferably coloured differently or made of different size from those of other denominations to enable the clerk or accountant to readily tell what amount each token represents.

The tubes 1 are transparent or slit up the front to enable the operator to see how many tokens are left in the tube and a graduated depth measure is used or a graduated scale is marked on each tube so that in checking up accounts the number of tokens used and the number remaining in the tube may be seen at a glance. A bar 8 hinged at one end of the row of tubes is adapted to close the tops thereof. Slots $8^a$ are provided in the bar 8 for inserting tokens into the tubes, and securing means $8^b$ are provided at the end thereof. The following mechanism is provided to remove tokens from the tubes. Keys 3 are journalled on a shaft 4 which extends longitudinally behind the row of tubes 1. The keys pass through slots 5 in the upper part of the device beneath the token tubes 1 and are provided with tips $3^a$ at their outer ends. The inner end of each key 3 is pivotally connected with one end of a link 6, the other end of the link being pivotally connected with a lug $7^b$ formed beneath a plate 7. The ejector plate 7 is slidably mounted beneath each tube 1, in a slide 30 which is provided with guide flanges $30^a$ on which the edges of the tubes 1 rest. A raised portion $7^a$ is formed at the front of the plate. This raised portion is of substantially the same thickness as a token and the side edges $7^c$ of the plate are turned up to a height equal to that of the raised portion $7^a$. The raised portion is normally at the base of the tube with the column of tokens resting on it. Its top is slightly lower than the top of the flanges $30^a$. When the key 3 is pushed down the link 6 is actuated and forces the plate 7 forward, the raised portion $7^a$ being carried forward to a position beneath the front wall of the tube, thus causing the column of tokens to drop down and rest on the lower part of the plate 7. A bent spring 25 is secured to the forward end of each key, is bent around the shaft 4 and the ends engage the frame of the device. When the key is released this spring causes the key and the plate 7 to return to normal position. The raised portion $7^a$ carries the lowest token in the column backwards and the force of the spring causes it to be ejected backwards to a chute 24 which leads to a compartment $12^b$ in the cash drawer 12. In the last tube which contains $10.00 or multiples of $10.00 tokens the plate 7 is reversed, the normal position of the raised portion $7^a$ being below the rear wall of the tube so that the tokens are carried forward when the key 3 is pushed down, and may be removed from the plate by the finger of the operator.

Below the token tubes 1, is the token drawer 9. This drawer is divided into a plurality of compartments $9^a$. Over the token drawer is a removable cover 10 having a slot $10^a$ therein opening into each compartment. Adjacent each slot is a label indicating some department of the store, or in the alternative some clerk in the store. These labels may contain the names of the departments, or clerks, when the departmental system is not used, or numbers representing the same.

Between the cover 10 and the token drawer are slidable screens 11 having slots $11^a$ therein corresponding to the slots $10^a$. These screens may be slid by means of the knob $11^b$ which extends through a slot $10^b$ to a position where the slots $11^a$ are not in alignment with the slots $10^a$ and thus prevent any unauthorized person from inserting tokens into the token drawer.

To one side of the token drawer 9 is a separate token drawer $9^b$ provided to hold an extra supply of tokens.

Beneath the token drawer is a cash drawer 12 having various compartments $12^a$ for the cash, and the compartment $12^b$ which receives the tokens from the tubes as already described. A spring 13 tends to force the cash drawer open, and a releasable catch holds it in a closed position against the force of the spring. The catch consists of a keeper 14 in the rear wall of the cash drawer and a latch 15 adapted to engage the keeper. The latch is pivoted to one end of a crank arm 16 which is journalled in the side of the device and an operating handle 17 is secured to the other end thereof. When the operating handle 17 is pulled forward the latch 15 is raised out of engagement with the keeper and the spring 13 forces the drawer open. When the handle is released it falls back to normal position, ready to be again actuated, and the latch 15 drops to its engaging position. There is sufficient lost motion in the connection with the crank arm 16 to allow the latch to be automatically raised when the cash drawer is closed and to drop down to engage the keeper.

To the right of the device is the recording device which operates as follows. A roller 18 and a roller 19 are mounted therein. On one end of the roller 19 is a ratchet wheel $19^a$, and a ratchet arm 20 is pivoted to a lever 21 by which the ratchet may be operated to rotate the roller 19. The lever 21 is shown as being identical with the operating handle 17. A roll of paper is wound about the roller 18 and passes over a platen 22 intermediate of the rollers and is secured to the roller 19 so that when the roller 19 is rotated the paper is pulled across the platen. A hinged cover 23 covers this device and is provided with an aperture $23^a$ therein above the platen 22 to allow the salesman to write a record of the sale, the amount, whether cash or credit, nature of the goods, and his own initial, on the paper roll beneath. Each sale is recorded on this roll, then the lever 21 is pulled forward and the paper is rolled along leaving a blank space over the platen on which the next sale is recorded. Since the lever 21 and the operating handle 17 are shown as being identical, the forward motion of the lever serves to open the cash drawer. When the lever is released it falls back and positions the ratchet arm 20 in engagement with the ratchet wheel $19^a$, so that when the lever is again pulled forward it causes the ratchet arm 20 to rotate the ratchet wheel $19^a$.

The operation of the device is as follows. At the beginning of a day the token tubes are full and when a sale is made the key 3 of the tube or tubes 1 containing tokens corresponding to the sale are pressed and the tokens are shot into the chute 24 and are carried to the compartment $12^b$ in the cash drawer 12. The salesman then makes a record of the sale on the recording device, initials it, and operates the lever 21, thus making a permanent record. The lever 21 and the operating handle 17 being identical, the operation of the lever serves to open the cash drawer 12. If cash is paid, the cash is deposited in the cash drawer, change is made, and the tokens removed from the compartment $12^b$ and deposited in the compartment or compartments $9^a$ in the token drawer 9, representing the department or departments of the store in which the sale is made. If the compartments represent salesmen, the salesman deposits the tokens in his own compartment. The record on the record device may be made after depositing the money in the cash drawer if desired.

At the end of a day the proprietor can by a glance at the scale on the token tubes, or by his depth measure, tell how much money would have been taken in, if the whole of the business had been done for cash. This is checked by counting the tokens in the token drawer, from which the sales in each department, or the sales of each clerk, as the case may be, are ascertained. The recording device acts as a further check both of the amount and details already ascertained, and shows the amount sold on credit. The money in the cash drawer should correspond to the amount shown by the three checks already made, less the credit sales.

If it is not desired to make up the accounts at the end of the day, the tubes may be replenished by tokens from the token drawer $9^b$, and a token or tokens from the last tube, which contains tokens which are any multiple of $10.00, equal to the value of the tokens replaced is removed and placed in the compartment $9^b$, to balance the supply kept on hand.

The value of the tokens in the last tube is the limit of the capacity of the device.

What I claim is:

1. In a cash register and sales recording device, the combination of a plurality of containers adapted to contain tokens of different denominations, said tokens being removable from said containers; means for visibly indicating the number of tokens in each container; a token drawer divided into a plurality of compartments; a cover for said token drawer having a slot therein opening into each of said compartments through which tokens may be deposited in the compartments; and a screen between the token drawer and the cover having slots therein corresponding to the slots in the cover, said screen being adapted to be moved so that the slots therein are out of alinement with the slots in the cover.

2. In a cash register and sales recording device the combination of a plurality of containers adapted to contain tokens of different denominations; means for visibly indicating the number of tokens in each container; a token drawer divided into a plurality of compartments into which tokens may be deposited; a cash drawer having a compartment therein adapted to receive tokens; means for ejecting tokens from the containers; a guide into which the tokens are ejected, said guide being adapted to guide the tokens into the cash drawer; means for graphically recording sales; and means for simultaneously operating the recording means and opening the cash drawer whereby the operator may deposit cash therein and receive tokens therefrom for deposit in the token drawer.

3. In a cash register and sales recording device the combination of a plurality of containers adapted to contain tokens of different denominations; means for visibly indicating the number of tokens in each container; a token drawer divided into a plurality of compartments into which tokens may be deposited; a cash drawer having a compartment therein adapted to receive tokens; means for ejecting tokens from the containers into the cash drawer; means for graphically recording sales; and means for simultaneously operating the recording means and opening the cash drawer whereby the operator may deposit cash therein and receive tokens therefrom for deposit in the token drawer.

Signed at Emo this 14 day of Nov., 1927.

ENOS W. HOGAN.